United States Patent [19]

Satoh et al.

[11] 4,394,735
[45] Jul. 19, 1983

[54] DATA PROCESSOR CONTROLLED BY MICROPROGRAMS

[75] Inventors: Kiyosumi Satoh; Nobuyuki Watanabe, both of Kawasaki, Japan

[73] Assignee: A. Aoki & Associates, Tokyo, Japan

[21] Appl. No.: 245,645

[22] PCT Filed: Jul. 23, 1980

[86] PCT No.: PCT/JP80/00167
§ 371 Date: Mar. 25, 1981
§ 102(e) Date: Mar. 20, 1981

[87] PCT Pub. No.: WO81/00315
PCT Pub. Date: Feb. 5, 1981

[30] Foreign Application Priority Data

Jul. 25, 1979 [JP] Japan .................. 54-94504

[51] Int. Cl.³ .............................................. G06F 1/00
[52] U.S. Cl. ............................................... 364/200
[58] Field of Search .............................. 364/200, 900

[56] References Cited

U.S. PATENT DOCUMENTS

| 3,634,883 | 1/1972 | Kreidermacher | 364/200 |
| 3,781,823 | 12/1973 | Senese | 364/200 |
| 3,900,835 | 8/1975 | Bell et al. | 364/200 |
| 4,057,850 | 11/1977 | Kaneda et al. | 364/200 |
| 4,070,703 | 7/1978 | Negi | 364/200 |
| 4,124,893 | 11/1978 | Joyce et al. | 364/200 |
| 4,168,523 | 9/1979 | Chari et al. | 364/200 |

FOREIGN PATENT DOCUMENTS

| 49-91737 | 9/1974 | Japan . |
| 50-26441 | 3/1975 | Japan . |
| 50-147251 | 11/1975 | Japan . |
| 51-130138 | 11/1976 | Japan . |

Primary Examiner—Joseph F. Ruggiero
Assistant Examiner—Michael R. Fleming
Attorney, Agent, or Firm—Staas & Halsey

[57] ABSTRACT

A data processor which is controlled by microprograms and which can execute machine instructions having suboperation codes in addition to operation codes. In the data processor, access to a control memory is performed by using a next address data obtained by a logical operation between contents of a next address field of a micro instruction read out of the control memory by using the operation code of the above-mentioned machine instruction and a selected one of suboperation index data of a micro instruction read out from the control memory by using the suboperation code of the machine instruction.

19 Claims, 8 Drawing Figures

Fig. 2A

| 0 | 7 8 | 11 12 | 15 16 | 19 20 | 31 |
|---|---|---|---|---|---|
| OP | R | X | B | D | |

Fig. 2B

| 0 | 7 8 | 15 16 | 19 20 | 31 |
|---|---|---|---|---|
| OP | SUB OP | B | D | |

Fig. 4

| 0 | 4 5 | 7 8 | 11 12 | 15 |
|---|---|---|---|---|
| B2 IDX | E5 IDX | 83 IDX | RSVD | |

DATA PROCESSOR CONTROLLED BY MICROPROGRAMS

DESCRIPTION

BACKGROUND OF THE INVENTION

The present invention relates to a data processor controlled by microprograms, and more particularly to a data processor which can execute machine instructions having suboperation codes without using a large capacity control memory and complex hardware.

In general, in a data processor controlled by microprograms, there are provided microprograms each of which corresponds to a machine instruction and each of which consists of one or more micro instructions. These microprograms are stored in a control memory, and when a machine instruction is to be executed, a microprogram corresponding to the machine instruction is read out from the control memory and executed, so that the control necessary for the execution of the machine instruction is provided.

In a conventional data processor controlled by the microprograms, the control memory address of the microprogram, necessary for executing a machine instruction which has no suboperation code, is obtained by using an operation code of the machine instruction as an address in the control memory. That is, by accessing the control memory at the address designated by the operation code of the machine instruction stored in an instruction register, the first micro instruction of the microprogram corresponding to the machine instruction is read out and stored in a micro instruction registor and executed.

However, in a recent data processor, machine instruction having suboperation codes, in addition to the above-mentioned operation codes, are used in order to expand the functions of the machine instructions. In such a data processor, if the operation code and the suboperation code are combined and used as an address for the control memory in a manner similar to the above-mentioned conventional data processor in order to execute such a machine instruction having the suboperation code, it is necessary to use a very large capacity control memory and thus the cost of hardware of the data processor is increased. Moreover, since the number of the machine instructions is usually much smaller than the binary number expressed by the total number of bits in the operation code and the suboperation code, only a part of the control memory is filled by the micro instructions, if a large capacity control memory is used, and thus the control memory is not effectively utilized.

SUMMARY OF THE INVENTION

It is an object of the present invention to provide a data processor controlled by microprograms which can execute the aforementioned machine instructions having suboperation codes, at a high speed, without using a large capacity control memory and complex hardware.

It is another object of the present invention to provide a data processor which has expanded functions for the instructions, and whose functions of the instructions can be changed easily by changing the microprograms.

In the present invention, there is provided a data processor controlled by microprograms comprising an instruction register in which is stored a machine instruction having a suboperation code in addition to an operation code. The data processor further comprises a micro instruction register, which temporarily stores a micro instruction read out from said control memory. The read out is performed by using the operation code of the machine instruction stored in the instruction register and suboperation index codes. The suboperation index codes are contained in a micro instruction read out from the control memory by using the suboperation code of said machine instruction, a selector and a means for logical operation. Each of said micro instructions, which are stored in the control memory and read out by using said operation code, have a next address field and an address control field. Said selector selects one of said suboperation index codes according to the contents of said address control field. The next reading out from said control memory being performed by using a next address data obtained by a logical operation betwen the contents of said next address field and the selected suboperation index code by using said means for logical operation.

In the present invention, there is also provided a data processor controlled by microprograms comprising an instruction register in which is stored a machine instruction having a suboperation code in addition to an operation code, and a control memory which stores micro instructions. The data processor further comprises a micro instruction register which temporarily stores a micro instruction read out from said control memory by using said operation code. Also included are a second control memory storing a plurality of suboperation index codes which are read out by using said suboperation code, a suboperation index register in which an output from said second control memory is stored, a selector and a means for logical operation. Each of said micro instructions which are stored in said control memory and read out by using said operation code have a next address field and an address control field. Said selector selects one of said suboperation index codes set in said suboperation index register according to the contents of said address control field of said micro instruction read out and stored in said micro instruction register. The next reading out from said control memory being performed by using a next address data obtained by the logical operation between the contents of said next address field and the selected suboperation index code by using said means for logical operation.

Therefore, the data processor according to the present invention can execute machine instructions having suboperation codes at a high speed by using simple hardware, and functions of the machine instructions can be changed easily by changing the microprograms stored in the control memory.

DESCRIPTION OF THE PREFERRED EMBODIMENTS

With reference to the attached drawings, embodiments of the present invention will be explained.

Figure 1:
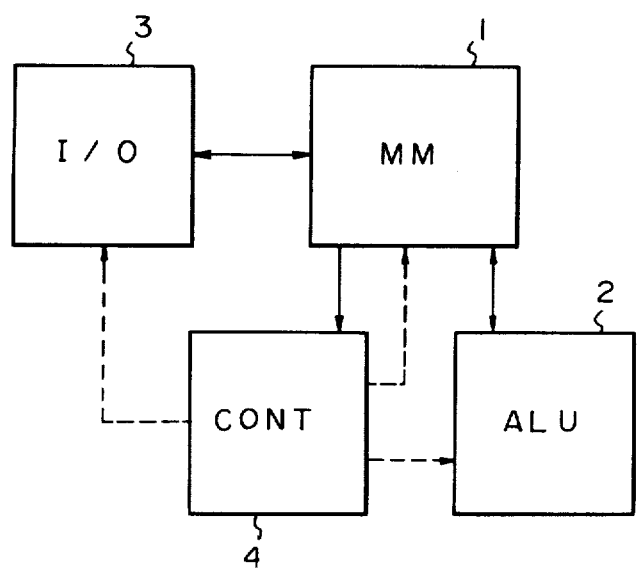
FIG. 1 is a block circuit diagram illustrating a data processor controlled by microprograms, according to the present invention.

FIG. 1 illustrates, in block diagram form, a data processor controlled by microprograms according to the present invention. The data processor shown in FIG. 1 comprises a main memory 1 which stores programs each comprising a series of machine instructions and data of every kind and an arithmetic and logic unit 2 which executes the programs and carries out arithmetic operations of any kind as well as data processing. Also included are an input and output unit 3 which carries out input and output operations data and a control unit 4 which controls the execution of the programs and input and output operations for the data.

In the data processor of FIG. 1, the data and programs are entered and stored in the main memory 1 from the input and output unit 3 through control by the control unit 4. The control unit 4 reads out and decodes a series of machine instructions, i.e., programs sequentially from the main memory 1, and executes the machine instructions by providing the necessary control signals to the arithmetic and logic unit 2. The data obtained by the execution of the programs are stored in the main memory 1 or transferred to the input and output unit 3. In the above-mentioned data processor, the control unit 4 operates under the control of microprograms, as will be mentioned later. In FIG. 1, dotted lines with arrows illustrate the flow of control signals and solid lines with arrows illustrate the flow of data schematically.

Figure 2A:
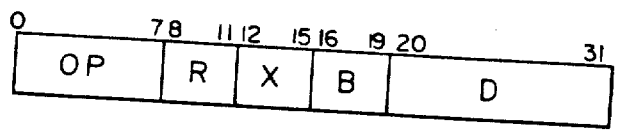
FIG. 2A and FIG. 2B are block diagrams illustrating an example of a format of a machine instruction used in the data processor of FIG. 1.
Figure 2B:
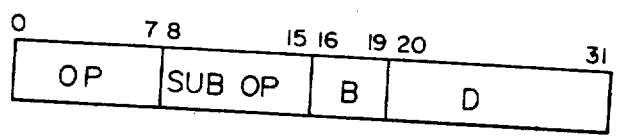

FIG. 2A and FIG. 2B illustrate examples of formats of machine instruction codes which are used in the data processor of FIG. 1 and which have 32 bits of length each. FIG. 2A illustrates a format of a machine instruction which does not have a suboperation code and which comprises of an operation code OP of 8 bits, an arithmetic register number R of 4 bits, an index register number X of 4 bits, a base register number B of 4 bits and an address data D of 12 bits. FIG. 2B illustrates a format of a machine instruction which has a suboperation code and which comprises of an operation code OP of 8 bits, a suboperation code SUBOP of 8 bits, a base register number B of 4 bits and an address data D of 12 bits.

Table 1 shows examples of such machine instructions having suboperation codes.

TABLE 1

| OP | SUBOP | function |
|---|---|---|
| B2 | 02 | STIDP |
| B2 | 03 | STIDC |
| B2 | 04 | SCK |
| B2 | 05 | STCK |
| . | . | . |
| . | . | . |
| . | . | . |
| B2 | 22 | IPTE |
| B2 | D8 | SRT |
| B2 | D9 | STRT |
| E5 | 01 | TPROP |
| 83 | 01 | LOAD FCR |

TABLE 1-continued

| OP | SUBOP | function |
|---|---|---|
| 83 | 02 | STORE FCR |
| 83 | 40 | CPA |

As illustrated in Table 1, there are three types of operation codes for machine instructions having suboperation codes, which are "B2", "E5" and "83" in hexadecimal notation. Each of the operation codes is combined with the suboperation code, which expands the function of the machine instruction. For example, the operation code "B2" is combined with one of the suboperation codes "02", "03", "04", ..., the operation code "E5" is combined with the suboperation code "01", and the operation code "83" is combined with one of the suboperation codes "01", "02", "40". The above-mentioned machine instructions have functions shown in the right column of Table 1. For example, machine instruction "B204" has a function SCK (Set Clock), i.e., the function of setting a time of day clock to a desired time; and machine instruction "B205" has the function STCK (Store Clock), i.e., the function of storing time data from the time of day clock into the main memory.

Figure 3:
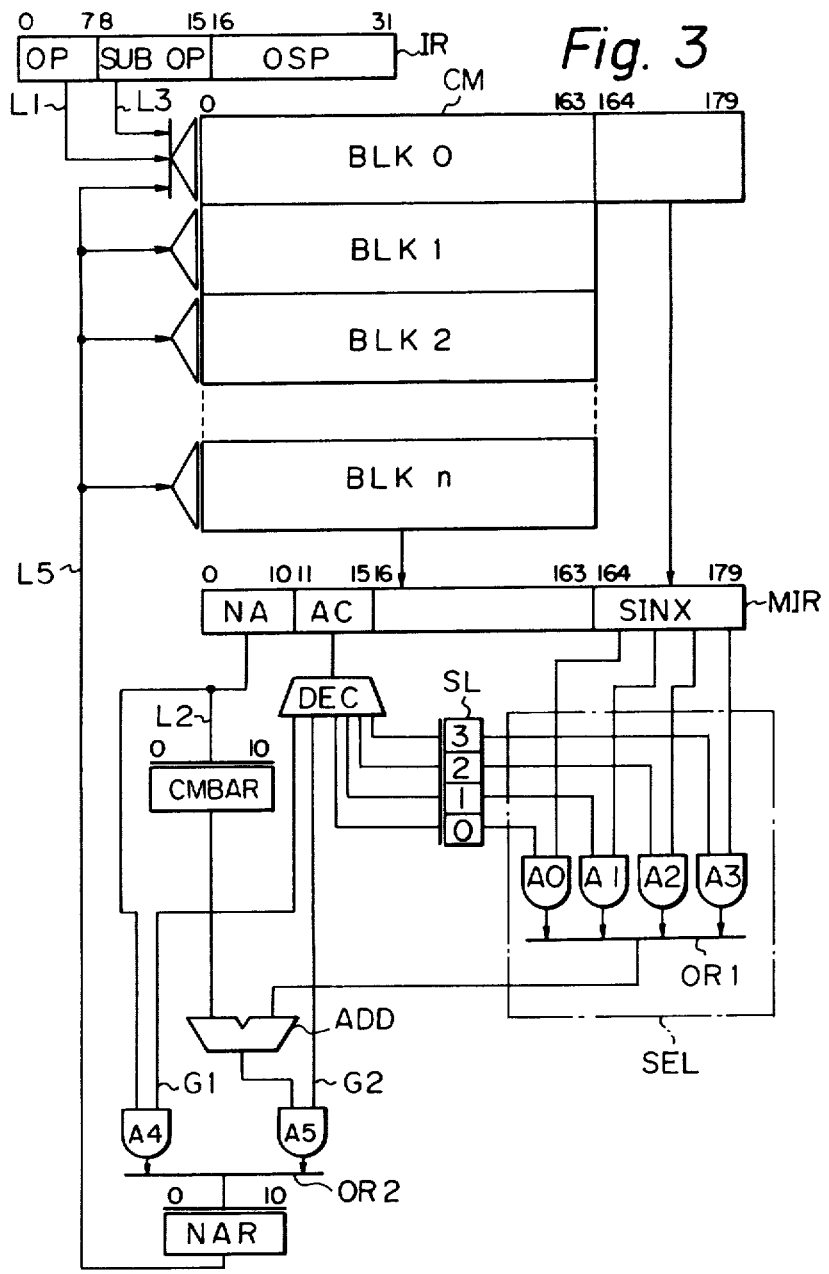
FIG. 3 is a block circuit diagram illustrating a first embodiment of a control unit used in the data processor of FIG. 1.
Figure 4:
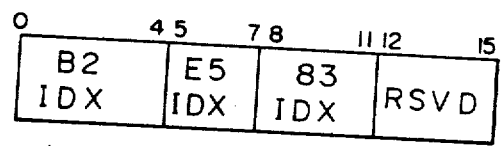
FIG. 4 is a block diagram illustrating a format of a suboperation index field of a micro instruction register used in the control unit of FIG. 3.
Figure 3:
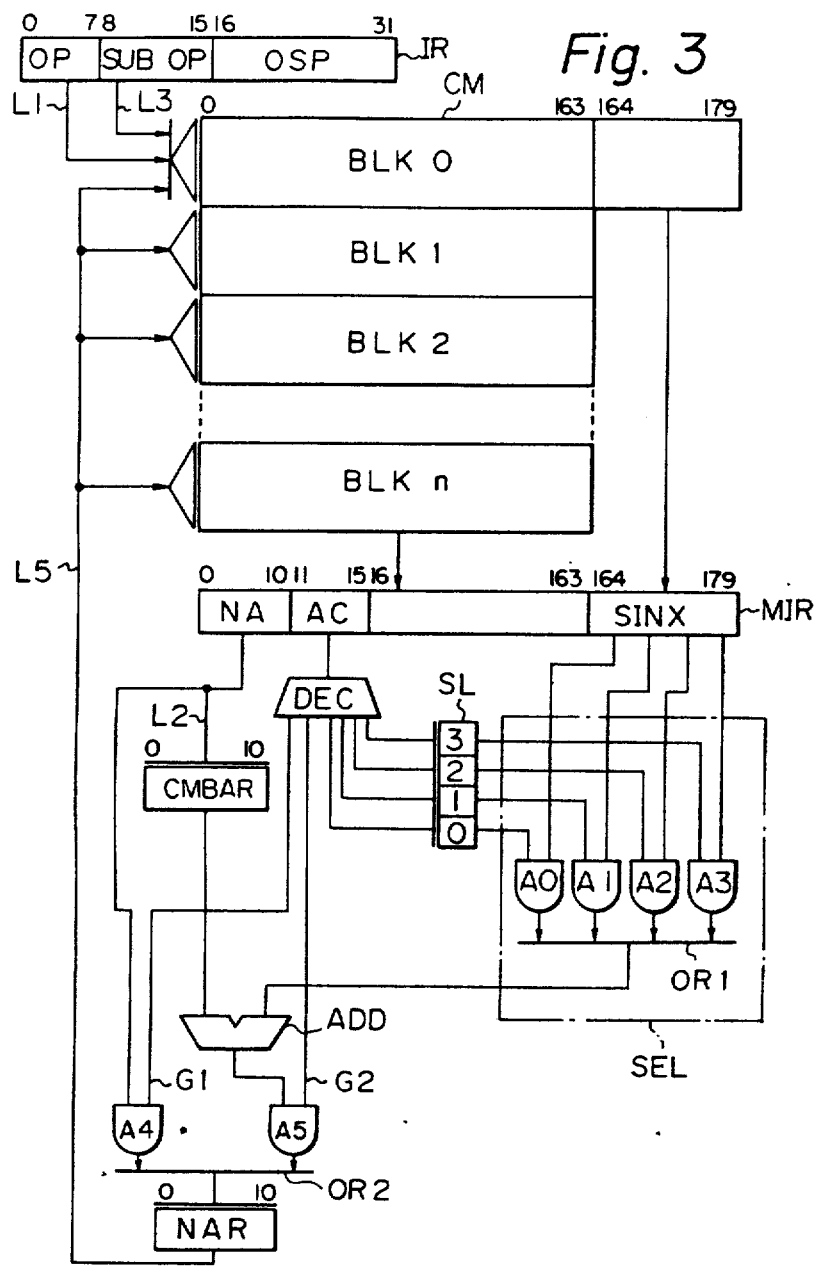
Figure 5:
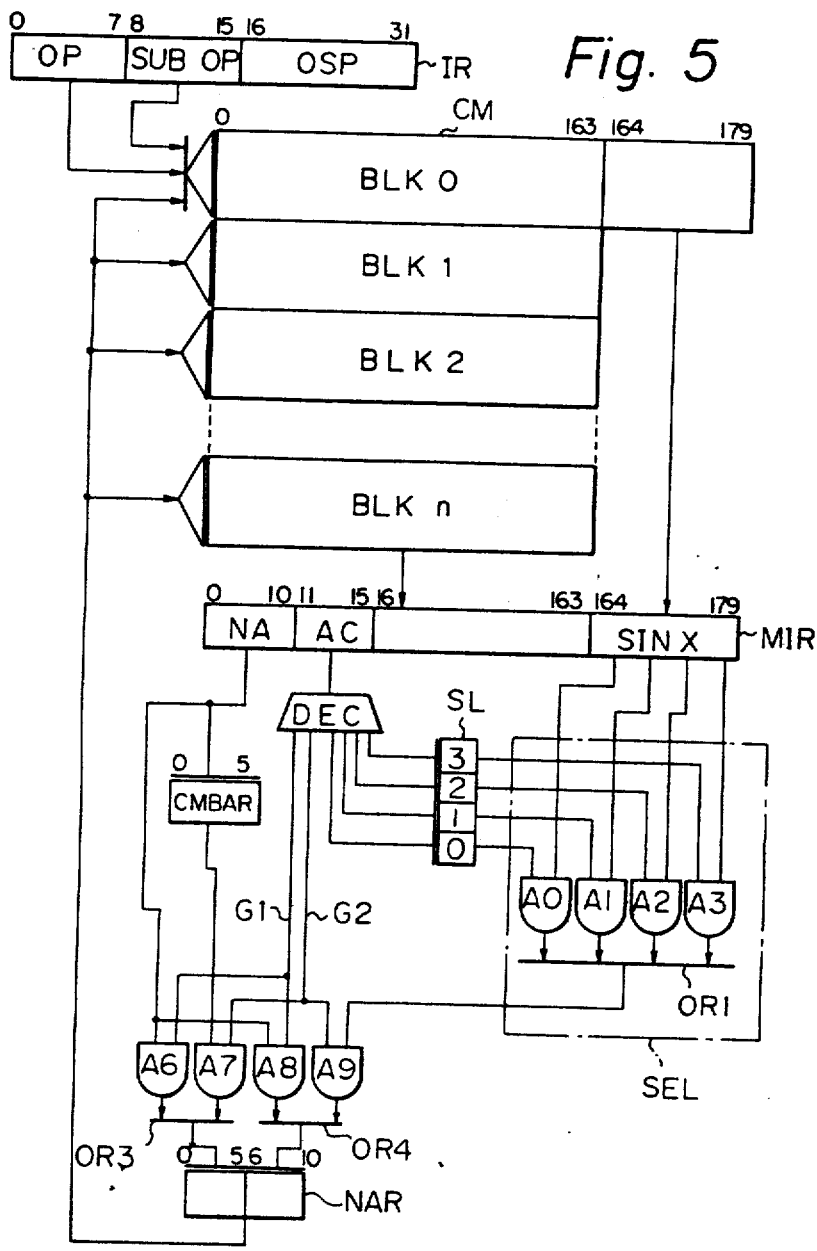
Figure 6:
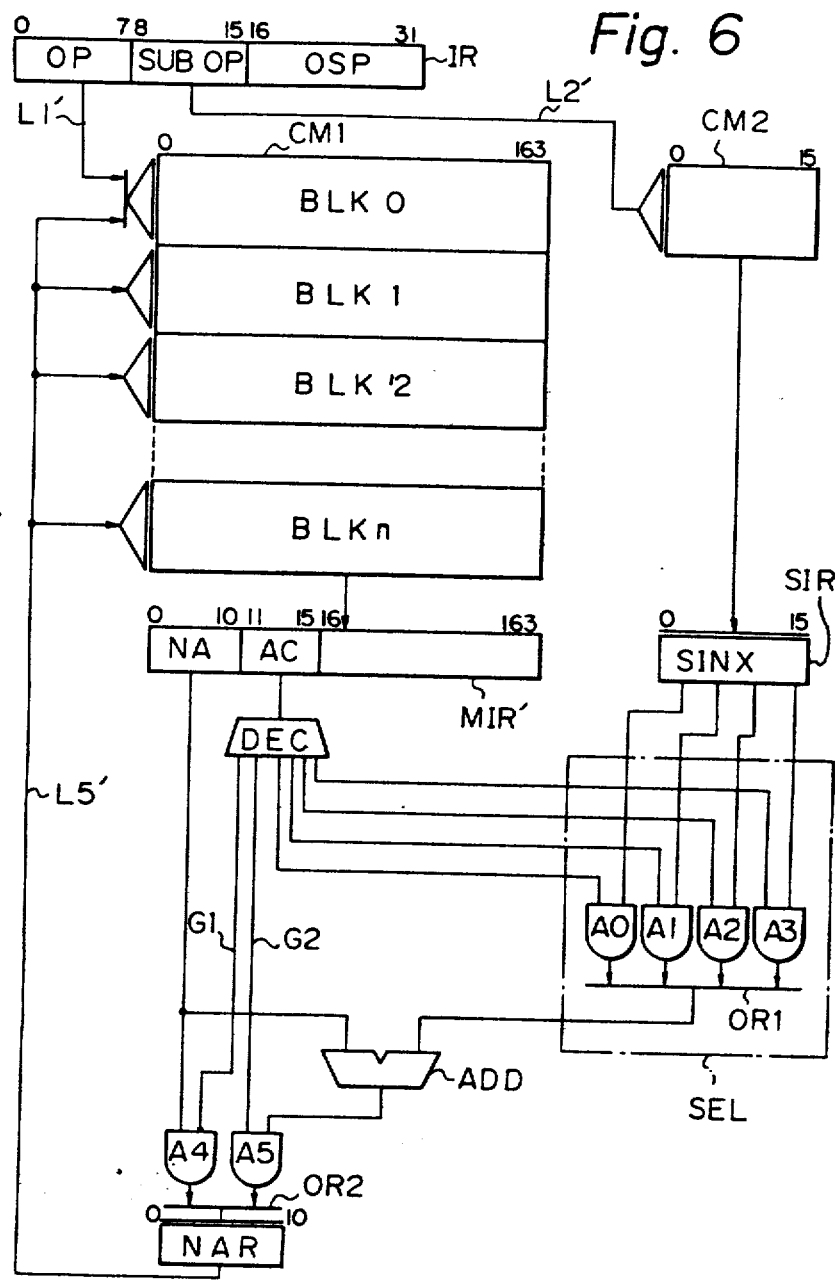
Figure 7:
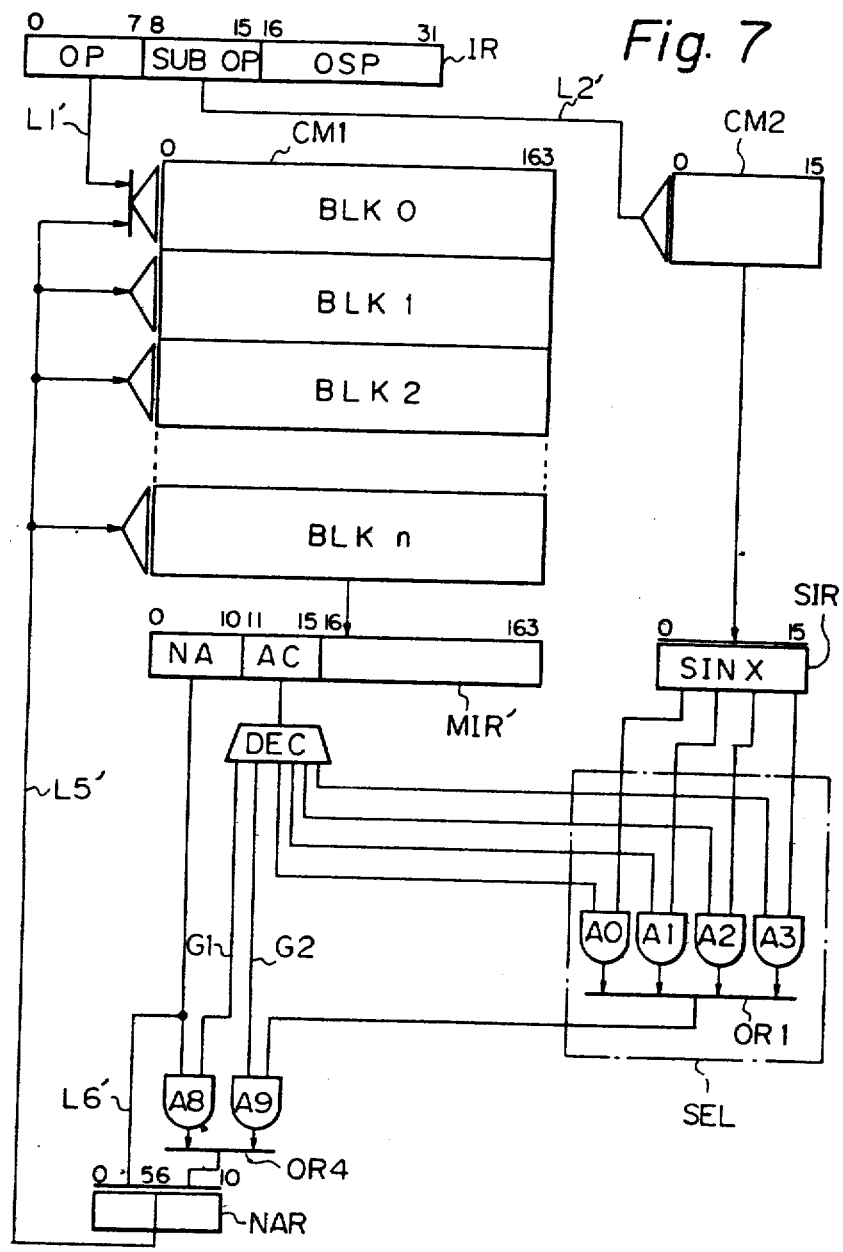

FIG. 3 illustrates a first embodiment of the control unit of the data processor of FIG. 1. In FIG. 3, instruction register IR is a 32 bit register in which the machine instruction read out from the main memory is stored. When the machine instruction having the suboperation code is stored in the instruction register, a part from 0 through the 7th bit of the instruction register operates as an operation code section OP, a part from the 8th through the 15th bit of the instruction register operates as a suboperation code section SUBOP, and a part from the 16th through the 31st bit of the instruction register operates as an operand designating section OSP. A control memory CM comprises of a plurality of blocks 0, 1, 2, ..., n and each of the blocks comprises of 256 words. The length of each of the words of the block 0 is 180 bits, and length of each of the words of the other blocks 1, 2, ..., n is 164 bits. Bit length of each of the words of the block 0 is longer than that of each of the words of the other blocks 2-n, because block 0 contains suboperation index data, as will be mentioned later. A micro instruction register MIR is a 180 bit register in which a micro instruction read out from the control memory CM is stored. The bit length of the micro instruction register MIR is the same as that of the longest block, i.e., block 0 of the control memory CM. The micro instruction register MIR comprises a next address part NA of 11 bits in length, an address control part AC of 5 bits in length and a suboperation index part SINX of 16 bits in length corresponding to all parts of the micro instruction stored therein. In the suboperation index part SINX, index data corresponding to each of the types of machine instructions are stored in different sections. As illustrated in FIG. 4, the suboperation index of a "B2" type machine instruction B2IDX is stored in a part from 0 through the 4th bits, the suboperation index data for an "E5" type machine instruction E5IDX is stored in a part from the 5th through the 7th bits, the suboperation index data for an "83" type machine instruction 83IDX is stored in a part from the 8th through the 11th bits, and a part from the 12th through the 15th bits is a reserved portion for future expansion of functions. In FIG. 3, a portion of the micro instruction register MIR from the 16th through the 163rd bits is connected to the arithmetic and logic unit ALU (FIG. 1), and provides the control signals necessary for execution of the micro instruction. However, a detailed description of the ALU control portion is omitted herein. A decoder DEC is connected to the address control part AC of the micro instruction register MIR, and decodes an address field code stored in the address control part AC. A control memory base address register CM BAR is an 11 bit register which temporarily stores the contents of the next address part NA of the micro instruction register MIR. A suboperation latch SL comprises a plurality of bit sections (0 through 3rd bits). A selector SEL selects one of the index data units or sections in the suboperation index part SINX according to the contents of the above-mentioned suboperation latch SL. The selector SEL comprises 4 AND gates A0 through A3 and an OR gate OR1. An adder ADD is adapted to add output data from the control memory base address register CM BAR and output data from the selector SEL. A4 and A5 designate AND gates, and OR2 designates an OR gate. A next address register NAR is a register in which an address, in the control memory CM, of the micro instruction to be read out next from the control memory CM is stored.

Operation of the control unit of FIG. 3 will now be described. When the machine instruction read from the main memory and stored in the instruction register IR is an instruction having no suboperation code, the micro instruction is read out from block 0 of the control memory CM and stored in the micro instruction register MIR by using the operation code OP of the machine instruction as an address. The micro instruction register MIR sends the control signals to each part of the data processor, for example to the arithmetic and logic unit ALU, and executes the machine instruction. When the execution of the machine instruction is completed by the one micro instruction, the next machine instruction is read out from the main memory and stored in the instruction register IR, and the micro instruction is read out from the control memory CM by using the operation code of the machine instruction as an address, as mentioned above. When the execution of the aforementioned machine instruction is not completed by the one micro instruction, the content data of the next address part NA of the micro instruction register MIR is sent through the AND gate A4 and the OR gate OR2 to the next address register NAR. Then the next block, i.e., block 1 of the control memory CM is accessed by using the data stored in the next address register NAR as address data, so that the next micro instruction is read out, is stored in the micro instruction register MIR and is executed.

In FIG. 3, when the machine instruction read out from the main memory and stored in the instruction register IR is an instruction having a suboperation code, the following control is executed. A first micro instruction, at the address designated by the operation code of the machine instruction read out and stored in the instruction register IR, is read out from the block 0 of the control memory CM and stored in the micro instruction register MIR. The address control field AC of the first micro instruction contains the control information which indicates that the machine instruction is one of the machine instructions having suboperation codes and also indicates the type of the machine instruction, for example "B2". According to this control information, a corresponding one of the bit parts of the suboperation latch SL is set by the decoder DEC. For example, when the machine instruction is "B2", the 0 bit part of the suboperation latch SL is set to a "high" level. At the same time, the contents of the next address field NA of the micro instruction register MIR is stored through a line L2 in to the control memory base address register CM BAR. Then the control memory CM is accessed again through a line L3 by using the suboperation code SUBOP in the instruction register IR as address data, and a second micro instruction is read out from the block 0 of the control memory CM and stored the micro instruction register MIR. Only the suboperation index field of this second micro instruction is used and all other fields of this micro instruction are ignored. In the suboperation index field SINX, a plurality of the index data are stored in different sections of the field, as aforementioned with reference to FIG. 4. One of these index data sections is selected by the selector SEL. That is, since each of the AND gates A0 through A3 of the selector SEL is connected to respective bit parts 0 through 3 of the suboperation latch SL, the data in the index data section selected by the sub-operation latch is allowed to pass through the AND gate. For example, when the 0 bit part of the suboperation latch SL is set to the "high" level, the index data section is selected to be that of a "B2" instruction, i.e., the data from 0 through the 4th bit of the suboperation index part SINX.

The index data from the suboperation index part selected by the selector SEL as described above and the next address data previously stored in the control memory base address register CM BAR are added by the adder ADD, and the resultant data is stored in the next address register NAR through the AND gate A5 and the OR gate OR2. In this case, the AND gate A5 is opened by a gate signal G2 from the decoder DEC. The next address information stored in the next address register NAR is transferred to the control memory CM through a line L5, and a third micro instruction indicated by the next address information is read out from the block 1 of the control memory CM, is stored in the micro instruction register MIR and is executed.

When more than three micro instructions are needed, the contents are the next address field NA of the third or succeeding micro instruction read out from the control memory CM is transferred to the next address register NAR whose content data is used for accessing the control memory CM.

Figure 5:
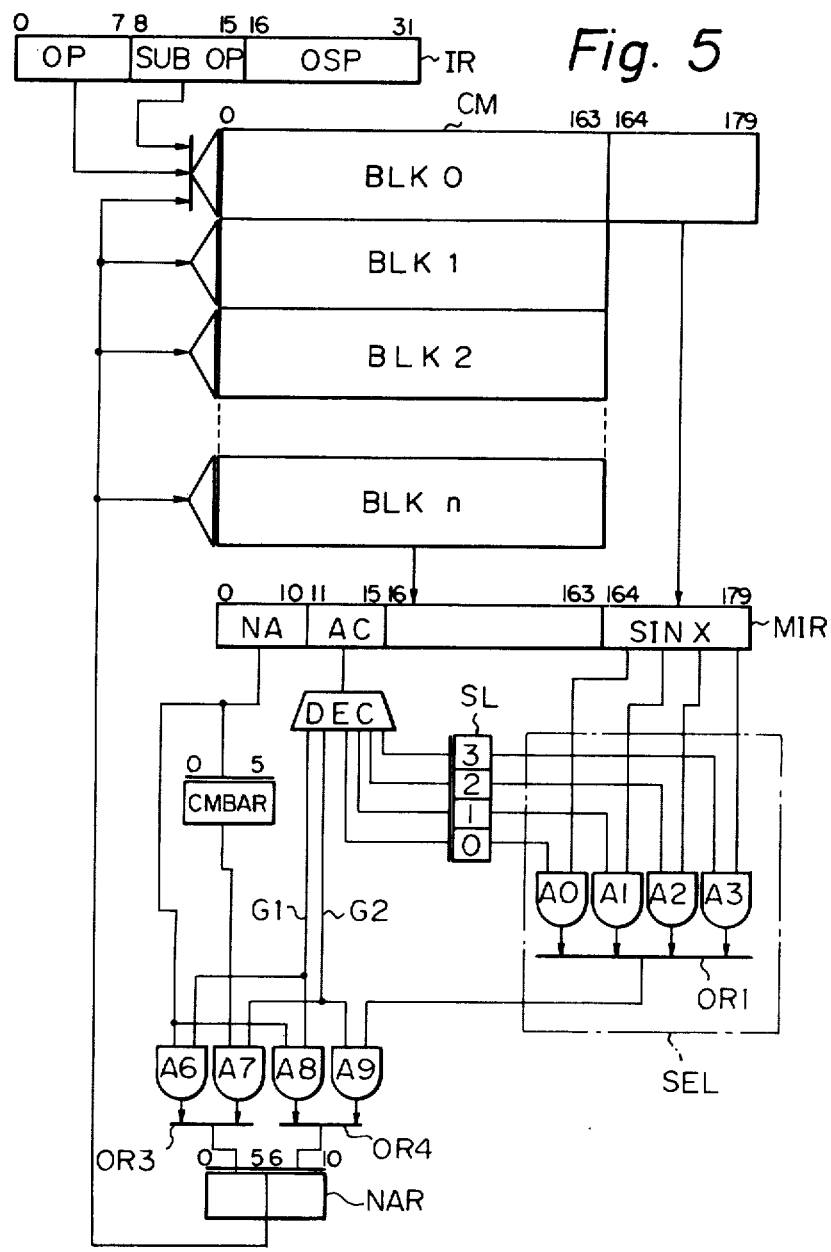
FIG. 5 is a block circuit diagram illustrating a second embodiment of the control unit used in the data processor according to the present invention.

FIG. 5 illustrates a second embodiment modified from the embodiment of FIG. 3. In the second embodiment, the adder ADD, the AND gates A4 and A5 and the OR gate OR2 in the embodiment of FIG. 3 are replaced by a combining circuit comprising four AND gates A6, A7, A8 and A9 and two OR gates OR3 and OR4. The control memory base address register CM BAR has a length of 6 bits, and can store the data of the upper 6 bits of the next address part NA of the micro instruction register MIR. The next address register NAR has a length of 11 bits, the same as that of the embodiment of FIG. 3, but the upper 6 bits and the lower 5 bits can be separately stored by the outputs of the OR gate OR3 and the OR gate OR4 respectively.

In the second embodiment illustrated in FIG. 5, the next address stored in the next address register NAR is obtained, not by addition, but by a logical combination of the data stored in the control memory base address register CM BAR and the output data from the selector SEL, when the machine instruction has the suboperation code. That is, the AND gates A7 and A9 are opened by the gate signal G2, and the data in the control memory base address register CM BAR and the output (i.e. suboperation index) of the selector SEL are stored in the upper 6 bits and the lower 5 bits of the next address register NAR, respectively, through the OR gates OR3 and OR4. Access to the control memory CM is effected by using the contents of the next address register NAR, whose upper bits and lower bits are separately stored, as mentioned above, as one address data.

When the machine instruction has no suboperation code, the AND gates A6 and A8 are opened by the gate signal G1, and the contents of the next address part NA of the micro instruction register MIR are separated into the upper 6 bits and the lower 5 bits and transferred through the OR gates OR3 and OR4 to the upper 6 bits and the lower 5 bits of the next address register NAR, respectively. As a result, the contents of the next address part NA of the micro instruction register MIR are transferred to the next address register NAR as before, and the control memory CM is accessed at the address designated by the contents of the next address register NAR. The other operations are the same as that of the embodiment of FIG. 3, and therefore, the explanation thereof is omitted herein.

Figure 6:
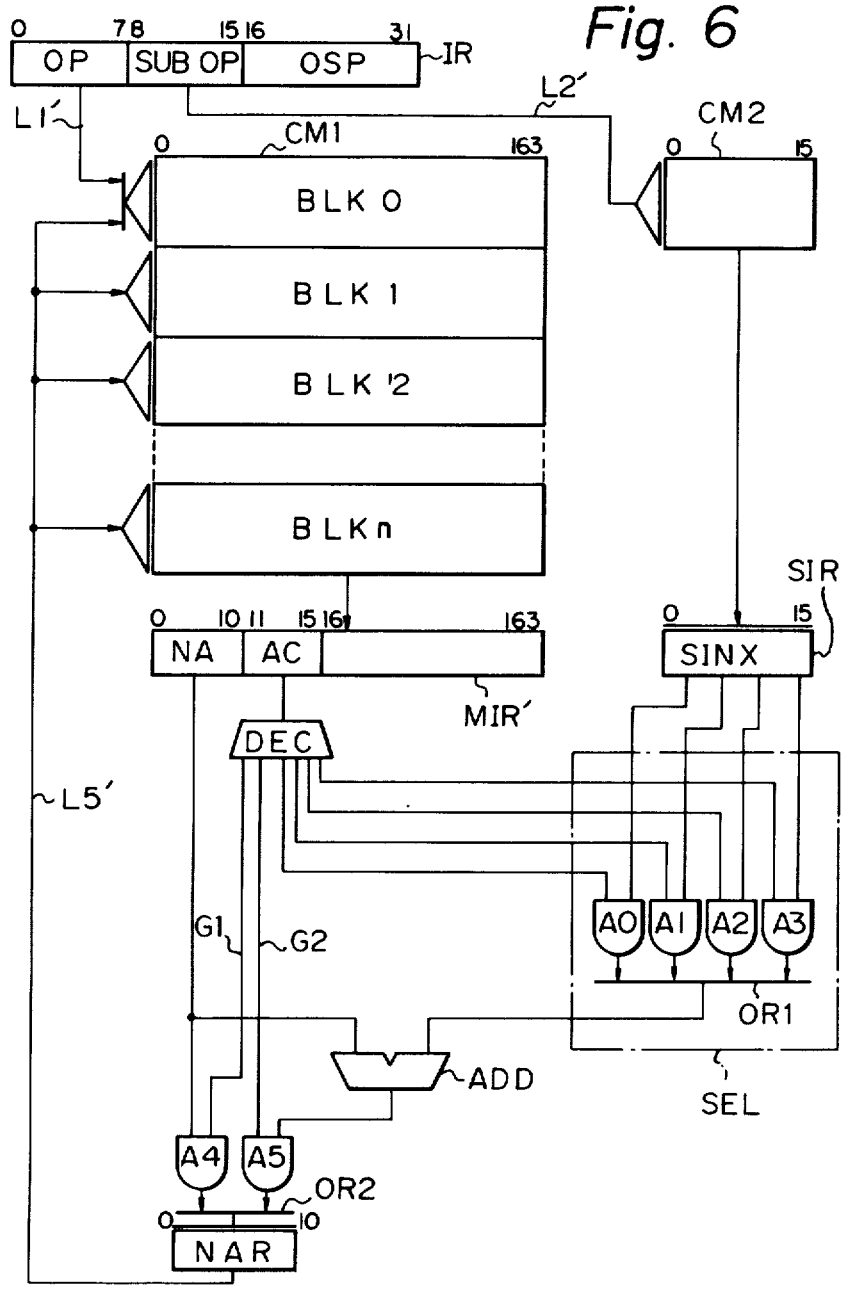
FIG. 6 is a block circuit diagram illustrating a third embodiment of the control unit used in the data processor according to the present invention.

FIG. 6 illustrates a third embodiment of the present invention. In this embodiment, there are provided two control memories CM1 and CM2. The control memory CM1 comprises a plurality of blocks 0, 1, 2, . . . , n, and each of the blocks comprises, for example, of 256 words. The word length of all of the blocks is 164 bits. The control memory CM2 comprises, for example, of 256 words whose word length are 16 bits each. A micro instruction register MIR' has a length of 164 bits, which is the same as the word length of each of the words of the control memory CM1, and comprises a next address section NA and an address control section AC, and so on. A suboperation index register SIR is a register having a length of 16 bits in which the suboperation index data from the second control memory CM2 is stored. In the embodiment of FIG. 6, the control memory base address register CM BAR contained in the embodiments of FIG. 3 and FIG. 5 is not used. The other circuit devices are the same as those in the embodiment of FIG. 3, and the same reference symbols are added thereto.

Operation of the embodiment illustrated in FIG. 6 will now be explained. When the machine instruction having the suboperation code is read out from the main memory and stored in the instruction register IR, block 0 of the control memory CM1 is accessed through a line L1' by using the contents of the operation part OP of the instruction register IR as address data; and a first micro instruction corresponding to the content data is read out and stored in the micro instruction register MIR'. At the same time, the second control memory CM2 is accessed through a line L2' by using the contents of the suboperation code part SUBOP as address data; and first micro instruction suboperation index data, corresponding to the suboperation code SUBOP of the machine instruction, is read out and stored in the suboperation index register SIR. The suboperation index register SIR has the same format as that of the suboperation index part SINX or the micro instruction register MIR in the embodiment illustrated in FIG. 3, and the format has been described with reference to FIG. 4. One of the suboperation index data sections is selected by the selector SEL by using the data in the address control part AC of the micro instruction register MIR' decoded through the decoder DEC. The output from the selector SEL and the output from the next address part NA of the micro instruction register MIR' are added in the adder ADD, and the resultant next address data is stored in the next address register NAR through the AND gate A5 and the OR gate OR2.

By using the next address data obtained by the above mentioned process, access to the control memory CM1 is performed through a line L5', and a second micro instruction is read out from the control memory CM1, stored in the micro instruction register MIR' and executed.

Therefore, in the embodiment illustration FIG. 6, it is not necessary to read out the control memory twice as in the embodiment of FIG. 3 or FIG. 5. Therefore, it is possible to obtain a header address in the control memory CM1, which is necessary for the execution of the machine instruction having a suboperation code, in a short time due to the reading out of the control memory CM1 and the second control memory CM2 at the same time.

Figure 7:
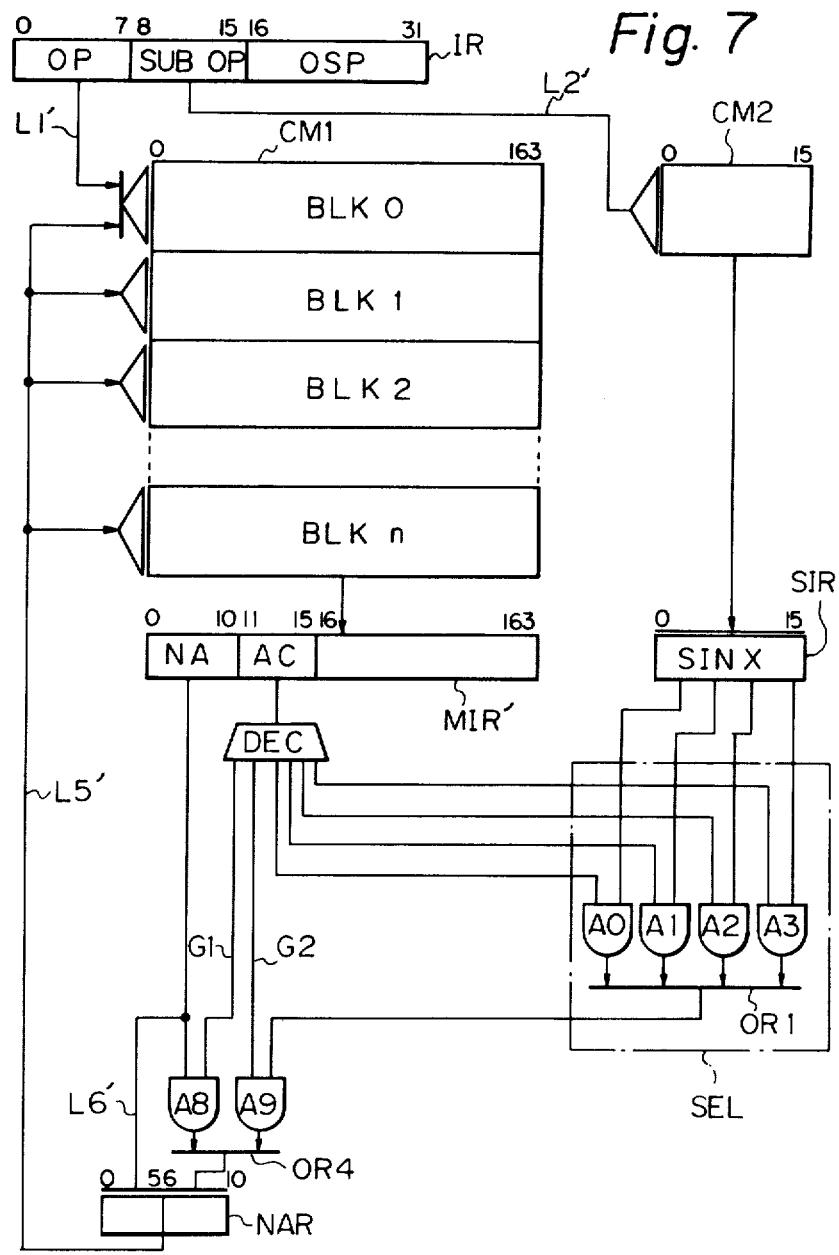
FIG. 7 is a block circuit diagram illustrating a fourth embodiment of the control unit used in the data processor according to the present invention.
Figure 1:
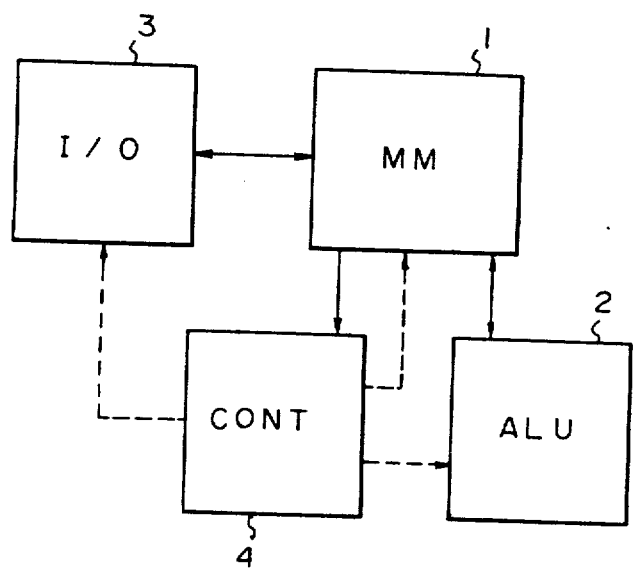

FIG. 7 illustrates a fourth embodiment modified from the embodiment illustrated in FIG. 6. In FIG. 7, the adder ADD, the AND gates A4 and A5 and the OR gate OR2 in the embodiment of FIG. 6 are replaced by a combination circuit comprising two AND gates A8 and A9 and an OR gate OR4. The next address register NAR has a length of 11 bits, the same as that in the embodiment of FIG. 5, and it is possible to store data separately in to the upper 6 bits and the lower 5 bits of the next address register NAR.

In the embodiment illustrated in FIG. 7, when the machine instruction has a suboperation code, the next address data stored in the next address register NAR is comprised of the logical combination of the upper 6 bits of the next address part NA of the micro instruction register MIR' and the output data from the selector SEL. That is, into the upper 6 bits of the next address register NAR, the data from the upper 6 bits, i.e., 0 through the 5th bits, of the next address part NA of the micro instruction register MIR' is transferred through a line L6' and into the lower 5 bits of the next address register NAR, the output from the selector SEL is transferred through the AND gate A9, which is opened by the gate signal G2 supplied from the decoder DEC, and the OR gate OR4.

When machine instruction has no suboperation code, the upper 6 bits from the next address part NA are stored in the upper 6 bits of the next address register NAR through the line L6'; and the lower 5 bits are stored in the lower 5 bits of the next address register NAR through the AND gate A8, which is opened by the gate signal G1, and the OR gate OR4. The other operation is the same as that of the embodiment of FIG. 6, and therefore the description thereof is omitted herein.

In the embodiment illustrated in FIG. 7, there is provided the second control memory CM2 in addition to the control memory CM1, which is the same as in the embodiment illustrated in FIG. 6. The reading out of the control memory CM1 and the second control memory CM2 is effected at the same time, consequently, the address in the control memory CM1 necessary for the execution of the machine instruction having the suboperation code is obtained in a short time.

In the above-mentioned embodiments, the next address is obtained by the combination of the data in the next address part NA of the micro instruction register MIR' and the output data from the selector SEL, or by using these data as the upper bits and the lower bits, respectively. However, it should be noted that these data can be combined by the other method previously discussed.

As mentioned above, the data processing controlled by microprograms according to the present invention can execute machine instructions having suboperation codes at a high speed by using simple hardware, and functions of the machine instructions can be changed easily by changing only the microprograms stored in the control memory.

The data processor according to the present invention is useful as an electronic computer, and electronic exchanger or other electronic data processor, and is particularly suitable for a data processor having many kinds of functions for machine instructions.

We claim:

1. A data processor controlled by microprograms, comprising:
   an instruction register for storing a machine instruction having a suboperation code and an operation code;
   a control memory, operatively connected to said instruction register, for storing a first micro-instruction having next address data and address control data and a second micro-instruction having suboperation index data units;
   a micro-instruction register, operatively connected to said control memory, for temporarily storing the first micro-instruction read out in a first access of said control memory by using the operation code of the machine instruction stored in the instruction register, and the suboperation index data units contained in the second micro-instruction read out in a second access of the control memory by using the suboperation code of said machine instruction;
   a selector operatively connected to said micro-instruction register; and
   means, operatively connected to said micro-instruction register, said selector and said control memory, for logical operation;
   each of said first micro-instructions are stored in the control memory and read out by using said operation code, said selector selecting one of said suboperation index data units according to said address control data, a third access to said control memory being performed by using combined next address data obtained by the logical operation between said next address data and the selected suboperation index data unit using said means for logical operation.

2. A data processor as set forth in claim 1, wherein said data processor further comprises:
   a control memory base address register, operatively connected between said micro-instruction register and said means for logical operation, for temporarily storing the contents said next address data of said micro-instruction read out into said micro-instruction register; and
   a suboperation latch, operatively connected between said micro-instruction register and said selector, for temporarily storing said address control data of said first micro-instruction read out from said control memory into the micro-instruction register by using said operation code being stored in said instruction register, said second micro-instruction which contains said suboperation index data units being read out from said control memory by using said suboperation code, said selector selecting one of the suboperation index codes according to the contents of said suboperation latch, the third access to said control memory being performed by using the combined next address data obtained by the logical operation between the contents of said next address data stored in said control memory base address register and the selected suboperation index data unit by using said means for logical operation.

3. A data processor as set forth in claim 1 or 2, wherein said logical operation is an addition.

4. A data processor as set forth in claim 1 or 2, wherein said combined next address data includes first and second data groups,
   wherein said logical operation is a logical combination in which said combined next address data is obtained by using the contents of said next data as the first data group and by using said selected suboperation index data unit as the second data group.

5. A data processor controlled by microprograms, comprising:
   an instruction register for storing a machine instruction having a suboperation code and an operation code;
   a first control memory, operatively connected to said instruction register, for storing micro-instructions each having next address data and address control data;
   a micro-instruction register, operatively connected to said first control memory, for temporarily storing one of the micro-instructions read out from said first control memory by using said operation code;
   a second control memory, operatively connected to said instruction register, for producing as an output and storing a plurality of suboperation index codes each having suboperation index data units which suboperation index codes are read out by using said suboperation code;
   a suboperation index register, operatively connected to said second control memory, for storing one of the suboperation index codes output from said second control memory;
   a selector operatively connected to said suboperation index register and said micro-instruction register; and
   means, operatively connected to said micro-instruction register and said selector, for logical operation;
   each of said micro-instructions are stored in said first control memory and read out by using said operation, said selector selecting one of said suboperation index data units stored in said suboperation index register according to said address control data of said micro-instruction read out into said micro-instruction register, a next access to said first control memory being performed by using combined next address data obtained by the logical operation between said next address data and the selected suboperation index data unit by using said means for logical operation.

6. A data processor as set forth in claim 5, wherein said logical operation is an addition.

7. A data processor as set forth in claim 5,
   wherein said combined next address data has first and second data groups, and
   wherein said logical operation is a logical combination in which said combined next address data is obtained by using the contents of said next address data as the first data group and by using said selected suboperation index data unit as the second data group.

8. A data processor controlled by microprograms, comprising:
   an instruction register having an operation code storage field and a suboperation code storage field;
   a first control memory, operatively connected to the operation code storage field of said instruction register, for storing and outputting micro-instructions;
   a second control memory, operatively connected to the suboperation code storage field of said instruction register, for storing and outputting suboperation index codes in dependence upon the contents of the suboperation code field;
   a micro-instruction register, operatively connected to said first control memory, having a next address storage field and an address control storage field;
   a suboperation index register, operatively connected to said second control memory, for storing and passing therethrough the suboperation index codes; and
   means, operatively connected to the next address storage field and the address control storage field of said micro-instruction register, said suboperation index register and said first control memory, for selecting one of the suboperation index codes in dependence on the contents of the address control storage field and for generating a combined next address in dependence upon the contents of the next address storage field and the one of the suboperation index codes selected, the combined next address being used to access said first control memory.

9. A data processor controlled by microprograms as set forth in claim 8, wherein said means for selecting and generating comprises:
   a decoder, operatively connected to the address control storage field of said micro-instruction register, for generating first and second control signals in dependence upon the contents of the address control storage field;
   a selector, operatively connected to said suboperation index register and said decoder, for selecting one of the suboperation index codes in dependence upon the first control signal; and
   a combining circuit, operatively connected to the next address storage field of said micro-instruction register, said decoder, said selector and said first control memory, for combining the contents of the next address storage field and the selected one of the suboperation index codes in dependence upon the second control signal.

10. A data processor controlled by microprograms as set forth in claim 9, wherein said combining circuit comprises:
   a first AND circuit operatively connected to the next address storage field of said micro-instruction register and said decoder;
   a second AND circuit operatively connected to said selector and said decoder; and
   a next address register operatively connected to said first and second AND circuits and to said first control memory.

11. A data processor controlled by microprograms as set forth in claim 10, wherein said next address register is operatively connected to the next address storage field of said micro-instruction register.

12. A data processor controlled by microprograms as set forth in claim 10, further comprising an adder operatively connected to said selector, said second AND circuit and the next address storage field of said micro-instruction register.

13. A data processor controlled by microprograms, comprising:
   an instruction register;
   a control memory, operatively connected to said instruction register, for storing micro-instructions;
   a micro-instruction register, operatively connected to said control memory, having a next address storage field, an address control storage field and suboperation index code storage fields; and
   means, operatively connected to said micro-instruction register and said control memory, for selecting one of the suboperation index code storage fields of said micro-instruction register in dependence upn the contents of the address control storage field and for generating a combined next address in dependence upon the contents of the next address storage field and the contents of the one of the suboperation code storage fields selected, the combined next address being used for accessing said control memory, said means for selecting and generating comprising:
   a decoder, operatively connected to the address control storage field of said micro-instruction register, for generating first and second control signals in dependence upon the contents of the address control storage field;
   a suboperation latch, operatively connected to said decoder, for storing and passing therethrough the first control signal;
   a selector, operatively connected to the suboperation index code storage fields of said micro-instruction register and said suboperation latch, for selecting one of the suboperation index code storage fields in dependence upon the first control signal; and
   a combining circuit, operatively connected to the next address storage field of said micro-instruction register, said decoder, said selector and said control memory, for combining the contents of the next address storage field and the contents of the selected one of the suboperation index code storage fields in dependence upon the second control signal to produce the combined next address.

14. A data processor controlled by microprograms as set forth in claim 13, wherein said combining circuit comprises:
   a control memory base address register operatively connected to the next address storage field of said micro-instruction register;
   a first AND circuit operatively connected to the next address storage field of said micro-instruction register and said decoder;
   an adder operatively connected to said control memory base address register and said selector;
   a second AND circuit operatively connected to said adder and said decoder; and
   a next address register operatively connected to said first and second AND circuits and to said control memory.

15. A data processor controlled by microprograms as set forth in claim 13, wherein said combining circuit comprises:

a control memory base address register operatively connected to the next address storage field of said micro-instruction register;

a first AND circuit operatively connected to the next address storage field of said micro-instruction register and said decoder;

a second AND circuit operatively connected to said control memory base address register and to said decoder;

a third AND circuit operatively connected to the next address storage field of said micro-instruction register and to said decoder;

a fourth AND circuit operatively connected to said selector and said decoder; and a next address register operatively connected to said first through fourth AND circuits and to said control memory.

16. A data processor controlled by microprograms as set forth in claim 11, wherein said selector comprises an AND circuit.

17. A data processor controlled by microprograms as set forth in claim 12, wherein said selector comprises an AND circuit.

18. A data processor controlled by microprograms as set forth in claim 14, wherein said selector comprises an AND circuit.

19. A data processor controlled by microprograms as set forth in claim 15, wherein said selector comprises an AND circuit.

* * * * *

UNITED STATES PATENT AND TRADEMARK OFFICE
CERTIFICATE OF CORRECTION

PATENT NO. : 4,394,735

DATED : JULY 19, 1983

INVENTOR(S) : KIYOSUMI SATOH ET AL.

It is certified that error appears in the above-identified patent and that said Letters Patent is hereby corrected as shown below:

FRONT PAGE [73] Assignee, "A. Aoki & Associates, Tokyo, Japan" should be --Fujitsu Limited, Kawasaki, Japan--.

The sheets of Drawings should be deleted to appear as per the attached sheets.

Col. 1, line 32, "registor" should be --register--;
      line 35, "struction" should be --structions--.

Col. 5, line 1, delete ",";
      line 8, "CM BAR" should be --CMBAR--;
      line 18, "CM BAR" should be --CMBAR--.

Col. 6, line 4, "in to" should be --into--;
      line 5, "CM BAR" should be --CMBAR--;
      line 9, after "stored" insert --in--;
      line 20, "sub-operation" should be --suboperation--;
      line 29, "CM BAR" should be --CMBAR--;
      line 41, "are" should be --of--;
      line 43, "is" should be --are--;
      line 44, "content data is" should be --contents are--;

UNITED STATES PATENT AND TRADEMARK OFFICE
CERTIFICATE OF CORRECTION

PATENT NO. : 4,394,735
DATED : JULY 19, 1983
INVENTOR(S) : KIYOSUMI SATOH ET AL.

It is certified that error appears in the above-identified patent and that said Letters Patent is hereby corrected as shown below:

```
Col. 6, line 59, after "OR4" insert --,--;
        line 64, "CM BAR" should be --CMBAR--;
        line 68, "CM BAR" should be --CMBAR--.

Col. 7, line 39, "CM BAR" should be --CMBAR--.

Col. 8, line 11, "illustration" should be --illustrated
                  in--;
        line 28, "in to" should be --into--;
        line 40, after "L6" insert --;--.

Col. 12, line 20, "upn" should be --upon--.

Col. 13, line 8, [line spacing is off] and
                  "addresss" should be --address--.
```

Signed and Sealed this

Nineteenth Day of March 1985

[SEAL]

Attest:

DONALD J. QUIGG

Attesting Officer     Acting Commissioner of Patents and Trademarks